United States Patent
Funkhouser et al.

[15] 3,655,317
[45] Apr. 11, 1972

[54] AUTOMATIC MOLD STRIPPING MACHINE

[72] Inventors: Harold F. Funkhouser; Charles W. Daugherty, both of Xenia, Ohio

[73] Assignee: Baxter Laboratories, Inc., Morton Grove, Ill.

[22] Filed: Feb. 26, 1970

[21] Appl. No.: 14,424

[52] U.S. Cl.............................425/165, 264/304, 264/334, 425/274
[51] Int. Cl....................................B29c 13/04, B29h 3/044
[58] Field of Search..................18/5.5, 24, 41, 2 K, DIG. 53, 18/4 B, 4 C, 4 P, 5 A, 2 RM; 264/334, 336, 304

[56] References Cited

UNITED STATES PATENTS

| | | |
|---|---|---|
| 3,304,576 | 2/1967 | Keesling et al............................18/2 K |
| 3,369,271 | 2/1968 | Rodrigues et al. ........................18/2 K |
| 1,872,327 | 8/1932 | Patten.....................................18/2 RM |
| 2,628,387 | 2/1953 | Landau...............................264/304 X |
| 2,759,217 | 8/1956 | Peterson...........................18/DIG. 53 |

FOREIGN PATENTS OR APPLICATIONS 8,935  8/1933  Australia..............................18/2 RM Primary Examiner—Robert L. Spicer, Jr.
Attorney—W. Garrettson Ellis and Samuel B. Smith, Jr.

[57] ABSTRACT

A machine for automatically stripping thin, flexible molded products from their molds on a continuously moving conveyor comprises, in essence, a movable array of arm pairs for clamping onto the molds, each arm having a pair of fingers for clamping onto a cuff or bead at the bottom of the molded product. The array of arms is attached to a movable carriage on a track parallel to the conveyor. A pneumatically actuated piston rod raises and lowers the array. Mechanical drive means are provided for engaging the carriage when the arm pairs are centered over the molds and for driving it at the same speed at the conveyor. As the carriage moves, it activates a series of switches which lower the array, clamp the arms onto the molds, clamp the fingers onto the beads, spread the arms again, and raise the array. A shuttle platform is driven under the raised array, and the stripped products are released. The carriage and the shuttle are then returned to their initial positions for a repetition of the cycle.

12 Claims, 7 Drawing Figures

HAROLD F. FUNKHOUSER &
CHARLES W. DAUGHERTY
INVENTORS

HAROLD F. FUNKHOUSER &
CHARLES W. DAUGHERTY
INVENTORS

BY *Walter C. Kehm*
ATTORNEY

AUTOMATIC MOLD STRIPPING MACHINE

BACKGROUND OF THE INVENTION

The present invention relates to a machine for stripping thin, flexible molded products from their molds on a continuously moving conveyor. It is particularly useful for stripping flexible products from continuously moving irregularly shaped molds. A brief description of the methods used in the mass production of thin, flexible molded products is useful in understanding the features and advantages of the present Seamless plastic and rubber gloves for medical or surgical use are typically made by curing a thin film of plastisol or latex on a hand-shaped mold. In mass production a plurality of hand-shaped aluminum molds are disposed in rows on a continuously moving conveyor belt. These molds are passed through a fluid dip of latex for plastisol; the excess fluid is drained off; and the fluid remaining on the mold is fused into a thin flexible film by passing the molds through an oven. The curing of the fused films is completed by cooling, and the gloves are then stripped from the molds.

In a typical process for making plastic gloves, the conveyor travels about 10 feet per minute. The molds are dipped in a plastisol comprising a dispersion of solid particulate polymer in a plasticizer such as, for example, dioctal phthalate or tricresyl phosphate. The polymer is typically comprised of vinyl halide resin polymers — either copolymers, homopolymers or terpolymers — with a predominating amount of vinyl halide, preferably vinyl chloride. After the molds are dipped in the plastisol, they are drained for about 5 minutes and then cured in an oven at 450° to 500° F. for about 5 minutes. The gloves are then passed through a cooler where they are cooled by forced air. The amount of cooling can be controlled by varying the rate of air flow.

Rubber gloves are formed from latex in a similar series of steps.

After the cooling step, the conveyor passes through a "cuffing" machine for forming a cuff or bead comprising a rolled portion approximately one-sixteenth inch in diameter around the wrist portion of the glove. On rubber gloves, for example, this step is accomplished by rotating brushes applied to the lower portion of the glove. The exposed portion of the glove is then covered with a fine lubricating powder, such as cornstarch, and stripped from the mold.

Because of the delicacy of the newly molded gloves and the fact that the production process is a continuous one which precludes the sudden stopping and starting of the conveyor, the stripping process has been heretofor carried out by workers who manually pulled the gloves from the molds as the conveyor moves past them. This work is both tedious and unpleasant. It is unpleasant because the molds are usually still quite warm, and the workers cannot wear protective gloves and retain the sense of touch required to grasp the newly formed gloves.

SUMMARY OF THE INVENTION

In accordance with the invention, a machine for automatically stripping thin, flexible products from their molds on a continuously moving conveyor comprises, in essence, a movable array of arm pairs for clamping onto the molds, each arm having a pair of fingers for clamping onto a cuff or bead at the bottom of the molded product. The array of arms is attached to a movable carriage on a track parallel to the conveyor by a pneumatically actuated piston rod which raises and lowers the array. Mechanical drive means are provided for engaging the carriage when the arm pairs are centered over the molds and for driving it at the same speed as the conveyor. As the carriage moves, it activates a series of microswitches which lower the array, clamp the arms onto the molds, clamp the fingers onto the beads, spread the arms again and raise the array. A shuttle platform is driven under the raised array, and the stripped products are released. The carriage and the shuttle are then returned to their initial positions for a repetition of the cycle.

DETAILED DESCRIPTION

Figure 1:
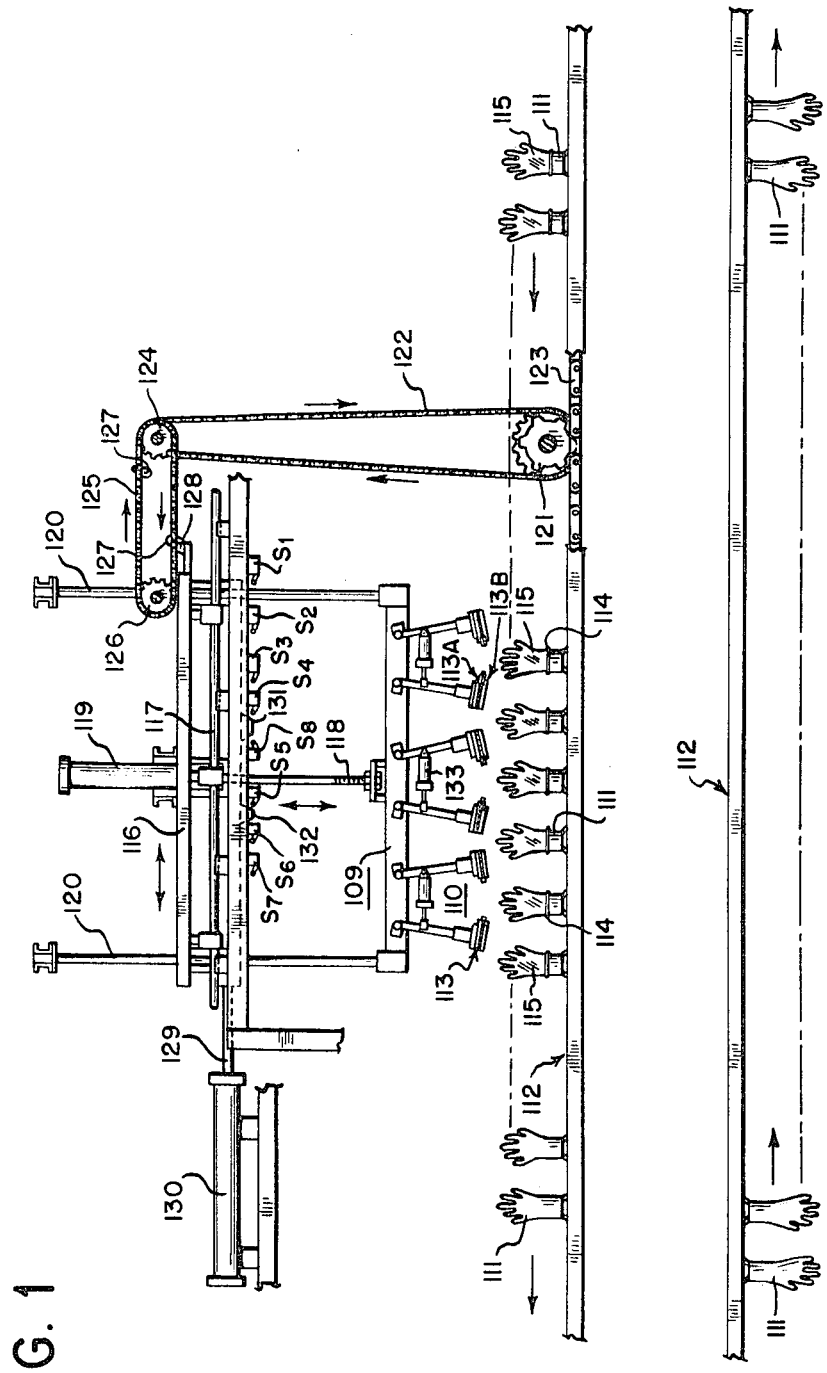
FIG. 1 is a partially schematic side view of an illustrative embodiment of a mold stripping machine in accordance with the invention.

In reference to the drawings, FIG. 1 illustrates a mold stripping machine comprising a movable array 109 of one or more arm pairs 110 for clamping onto the molds 111 attached to a continuously moving conveyor 112. Each arm has means for attaching itself to the molded product comprising, for example, a pair of fingers 113A and 113B for clamping onto the cuff 114 at the bottom of the molded product 115 which, in this particular example, is a glove.

The array 109 is connected to a movable carriage 116 disposed on a track comprising for example, a pair of cylindrical guide rods 117, parallel to conveyor 112. The connection is made by means of a movable piston rod 118 pneumatically coupled to an air cylinder 119. Four guide rods 120 are provided for ensuring that the array, when driven by piston rod 118, moves perpendicular to the carriage.

Mechanical means comprising, for example, a chain and sprocket arrangement are provided for driving carriage 116 at the same speed at the conveyor. In particular, a first set 121 of connected sprockets mechanically couples chain 122 to the conveyor drive chain 123. A second set of connected sprockets 124 couples chain 122 to the drive chain 125 which engages a second sprocket 126. The sprocket and chain arrangements are designed so that the drive chain moves with the same speed as the conveyor chain. Dogs 127 are disposed on the drive chain for engaging an upper catch 128 on movable carriage. The dogs are so located that they engage the carriage when the arm pairs are just centered over the molds. The length of the chain (or the distance between sprockets 124 and 126) is chosen so that the carriage disengages after the completion of a stripping cycle.

When engaged, carriage 116 is driven against the piston rod 129 of a constant pressure air cylinder 130. This constant pressure acts to cushion the motion of the carriage and, when the carriage is disengaged, to drive it back to its original position.

The underside of carriage 116 is provided with a pair of trippers 131 and 132 which sequentially actuate seven forward microswitches $S_1$ to $S_7$ on the forward motion of the carriage and one reverse switch $S_8$ on the return trip. The eight switches, in turn, actuate the various piston rods through solenoid controlled valves. These switch control the stripping operation as will be described in greater detail below.

In operation, the conveyor moves along until a array of molds are centered below the array of arm pairs. At this point, a dog engages the carriage and drives it forward at the same speed as the conveyor is moving. Tripper 131 then contacts switch $S_1$ which actuates piston rod 118 to lower array 109 around the molds. The second switch tripped actuates piston rod 133 of a rod and air cylinder arrangement connecting the arm pairs 110 so that each pair of arms clamps against a mold with the lower finger 113B on the mold below the cuff 114 and the upper finger 113A on the glove 115 above the cuff. The third switch actuates a piston rod (not shown) connecting the fingers so that they clamp together against the glove cuff. The fourth switch actuates piston rod 133 to spread the arms enough to clear any projections on the mold such as, for example, the thumb; the fifth switch actuates piston rod 118 to raise the arm array and, thus, strip the gloves from the mold.

The effect of the operations produced by switches $S_1$ to $S_5$ is more clearly illustrated by reference to FIGS. 4A, 4B, 4C and 4D which show the stripping process at various stages. FIG.

4A shows an arm pair 100 which has been lowered around a mold. A stop (not shown) has been provided so that when the arms are clamped together as in FIG. 4B, the upper fingers 113A are on the glove above the cuff 114, and the lower fingers 113B are below the cuff.

Means are provided for opening and closing the finger pairs comprising, for example, a piston rod 401 pneumatically coupled to an air cylinder (not shown). A pair of guide pins 402 and 403 are provided for keeping the two fingers aligned and for guiding the clamping motion.

In a preferred embodiment, the upper and the lower fingers are provided with curved plastic contact surfaces 404A and 404B, respectively, so that the gloves are not damaged by the clamping operations. More specifically, the contact surfaces can be polyurethane members curved to fit the mold. The lower finger which contacts the mold is made of hard polyurethane and is sufficiently longer than the upper finger (typically about 0.01 inch longer) that the latter exerts no significant pressure on the glove. The upper finger can be made of medium hard polyurethane (having a hardness of about 70 durometers) to cushion the clamping pressure on the cuff.

Figure 4A:
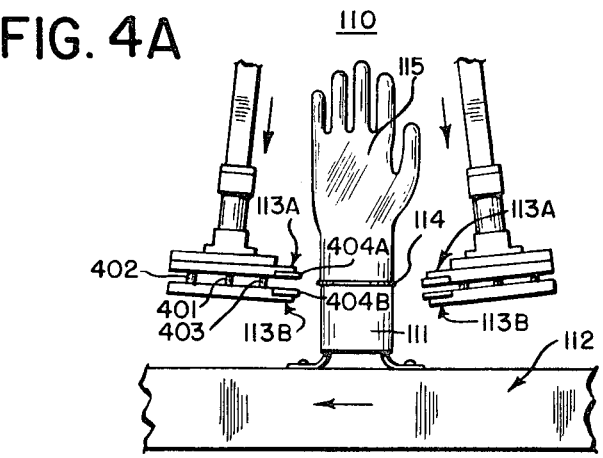
FIGS. 4A, 4B, 4C and 4D depict various aspects of stripping operation.
Figure 4B:
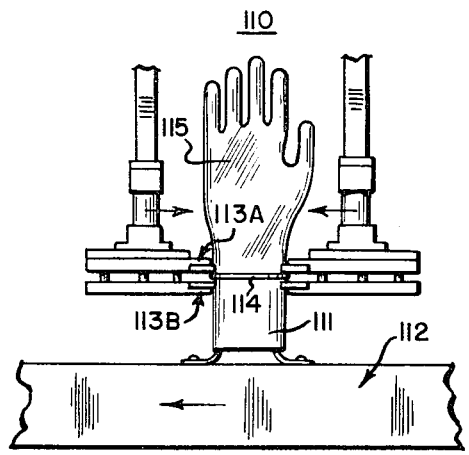
Figure 4C:
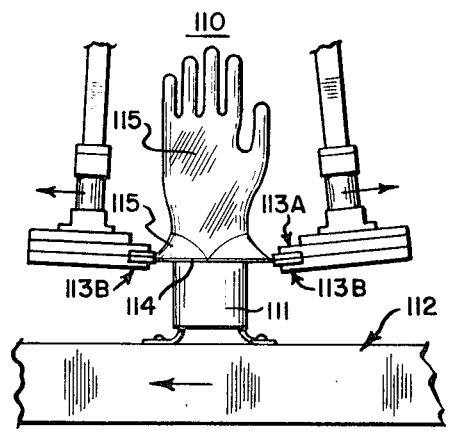
Figure 4D:
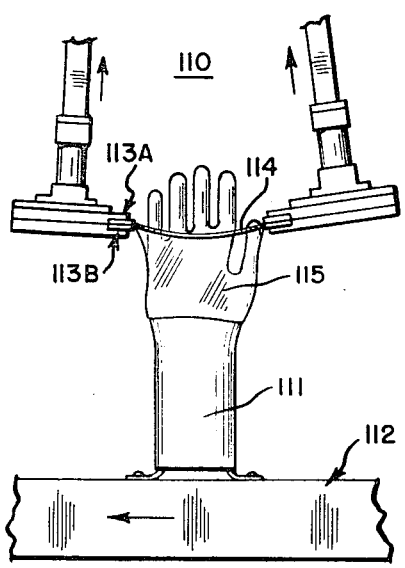

FIG. 4C shows the arm pair after the fingers have clamped onto the cuff and the arm pairs have spread apart (to clear the thumb) pulling the cuff and the lower portion of the glove away from the mold 111. FIG. 4D shows the arm pairs being raised (as the array is raised) stripping the glove from the mold.

Figure 2:
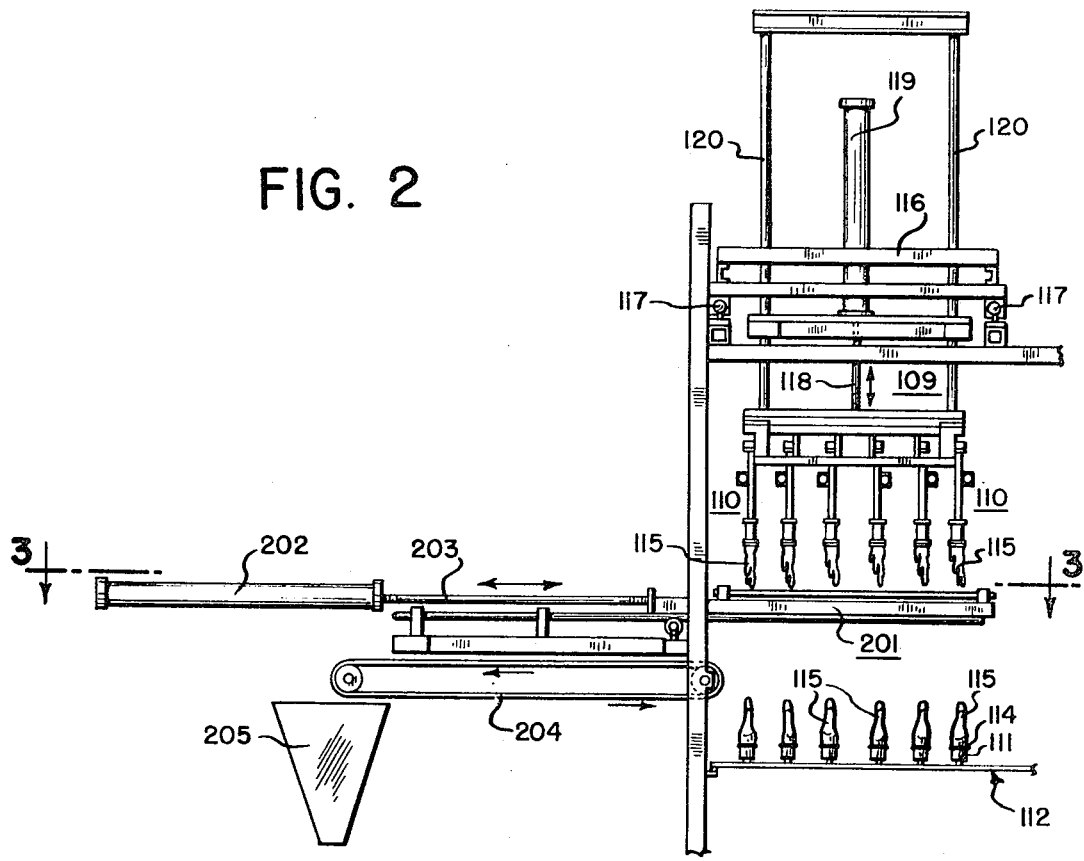
FIG. 2 is a partially schematic front view of the stripping machine shown in FIG. 1.

The operation actuated by the sixth switch can be seen by reference to FIG. 2 which is a partially schematic front view of the machine. A shuttle platform 201 is also shown pneumatically coupled to an air cylinder 202 by a piston rod 203. In addition, there is shown one of three separate output conveyors 204 feeding into an output chute 205.

The shuttle comprises a platform including a plurality of trap doors (not shown). In its initial position out from under array 109 and over conveyors 204, the doors are normally open.

The sixth switch actuates air cylinder 202 to drive the shuttle platform under the raised array of arm pairs and to close the trap doors. The seventh switch opens the finger pairs so that the gloves fall onto shuttle platform 201. At this point in the cycle, the dog disengages from the carriage, and piston rod 129 drives the carriage back to its initial position.

Figure 3:
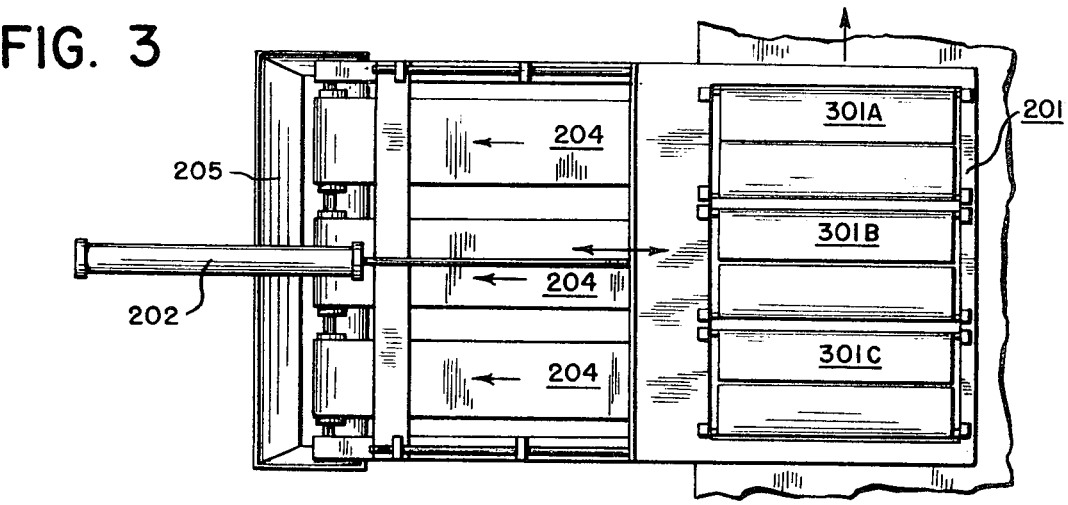
FIG. 3 is a top view of a shuttle mechanism useful in accordance with the invention.

During the return of the carriage, tripper 132 actuates reverse switch S₈ which causes the shuttle to return to its initial position over the conveyors. When the shuttle returns, the trap doors automatically open and drop the gloves onto a separate conveyor which, in turn, drops them into output chute 205, for packaging. This operation may be more clearly understood by reference to FIG. 3 which shows a top view of the shuttle platform 201 and the output conveyors 204. It will be noted that the shuttle platform contains three pairs of trap doors 301A, 301B and 301C, aligned with conveyors 304 and with the rows of arm pairs (not shown). This alignment ensures that the gloves will drop from the arms near the center of the trap doors and that they will drop near the center of conveyor 204.

It will be noted from FIG. 1 that the arm pairs encompass only every other mold. Thus, the time of a complete cycle — typically about 18 seconds — must be somewhat less than the time required for a row molds to move one position forward. This timing permits the machine to strip every mold even though it operates on alternate rows.

It is understood that the above described arrangements are merely illustrative of the many possible specific embodiments which can represent applications of the invention. For example, while the invention was described in the context of stripping gloves from molds, it is clear that it can also be used for stripping other types of flexible molded products such as, for example, rubber or plastic boots from their molds. In addition, it is clear that in certain applications means other than clamping — such as suction devices — can be used to attach the arm pairs to the molded products. Thus, numerous and varied other arrangements can be readily devised by those skilled in the art without departing from the spirit and scope of the invention.

We claim:

1. A machine for automatically stripping thin, flexible molded products from molds on a moving conveyor comprising:
    a movable array of one or more arm pairs attached to a hereinafter recited movable carriage adapted for clamping against said molds, each arm of said pair having a pair of fingers for clamping onto said flexible molded product;
    means for automatically moving said movable array parallel to said conveyor at the same speed as said conveyor when the arm pairs of said array are centered over an array of molds, said automatic moving means comprising a movable carriage driven on a track parallel to said conveyor against a constant pressure air cylinder for cushioning its movement and returning it to its initial position when a dog disengages, and said movable carriage mechanically coupled to said conveyor by a chain and sprocket arrangement including means for engaging said movable carriage when the array of arms is centered over an array of molds and disengaging from said movable carriage when the stripping cycle is completed;
    means for moving said array towards and away from said conveyor;
    control means for sequentially moving said array of arm pairs, clamping said arms against the molds, clamping said finger pairs of each arm onto said products, spreading said arm pairs to clear any projections of said molds, raising said array to strip said products from said molds and releasing said stripped products; and
    means for receiving said released products.

2. A machine for automatically stripping thin, flexible molded products from molds on a moving conveyor comprising:
    a movable array of one or more arm pairs adapted for clamping against said molds, each arm of said pair providing a pair of fingers for clamping onto said flexible molded products;
    means for automatically moving said movable array parallel to and at the same speed of said conveyor when said arm pairs of said array are centered over an array of molds;
    means for moving said array towards and away from said conveyor;
    control means for sequentially moving said array of arm pairs, clamping said arms against said molds, clamping said finger pair of each arm onto said molded products, spreading said arm pairs to clear any projections of said molds, raising said array to strip said products from the molds and releasing said stripped products; and
    means for receiving said released products.

3. A mold stripping machine according to claim 1 wherein said means for automatically moving said movable array parallel to said conveyor at the same speed as said conveyor comprises a movable carriage on a track parallel to said conveyor mechanically coupled to said conveyor by a chain and sprocket arrangement including means for engaging the carriage when the array of arms is centered over an array of molds, said array of arms being attached to said movable carriage.

4. A mold stripping machine according to claim 1 wherein said array of arms is attached to said movable carriage by a piston rod pneumatically coupled to an air cylinder for raising and lowering said array in response to said control means.

5. A mold stripping machine according to claim 4 wherein said control means comprise a series of switches actuated by the motion of said carriage.

6. A mold stripping machine according to claim 1 wherein:
    said flexible molded products have a cuff or bead on the bottom; and
    said means for moving said array towards and away from said conveyor is adapted to move said array toward said conveyor into a position where said arm pairs clamp onto said molds with one finger of each of said finger pairs above said cuff or bead and the other finger in contact with the mold below said product.

7. A mold stripping machine according to claim 6 wherein:
said means for automatically moving said movable array parallel to said conveyor at the same speed as said conveyor comprises a movable carriage disposed on a track parallel to said conveyor and means for mechanically coupling said carriage to said conveyor in such a manner as to move said carriage at the same speed as said conveyor; and
said means for moving said array towards and away from said conveyor comprises a piston and air cylinder arrangement attaching said array to said movable carriage.

8. A machine according to claim 7 including means for automatically disengaging said means for mechanically coupling said carriage to said conveyor upon the completion of a stripping cycle and means for automatically engaging the coupling means when the array of arm pairs is centered over an array of molds.

9. A machine according to claim 8 including means for returning said carriage to an initial position after it has been disengaged.

10. A machine according to claim 10 wherein said machine is adapted to complete a stripping operation on alternate rows of molds and to return to its initial position before the rows advance one position.

11. A mold stripping machine according to claim 1 wherein said automatic moving means moves said movable array intermittently from a first position along a path generally parallel to said conveyor thereby to travel with the same.

12. A mold stripping machine according to claim 1 wherein said means for moving said movable array drives said array in the direction of movement of said conveyor against a constant pressure air cylinder for cushioning its movement and returns said array in the opposite direction to said first position.

* * * * *

UNITED STATES PATENT OFFICE
CERTIFICATE OF CORRECTION

Patent No. 3,655,317          Dated April 11, 1972

Inventor(s) Harold F. Funkhouser et al.

It is certified that error appears in the above-identified patent and that said Letters Patent are hereby corrected as shown below:

Abstract, line 11, change "at" to --as--.
Column 1, line 8, change "irregularly shaped" to --irregularly-shaped--
        line 9, change "A" to begin a new paragraph.
        line 11, add "invention. These methods are illustrated by the steps involved in the production of plastic and rubber gloves."
        line 17, change "for" to --or--.
        line 28, change "of" to --or--.
        line 59, after "flexible" insert --molded--.
Column 2, line 32, change "at" to --as--.
        line 55, change "switch" to --switches--.
        line 57, change "a" to --an--.
Column 3, line 1, change "100" to --110--.
        line 63, after "row" insert --of--.

Signed and sealed this 19th day of September 1972.

(SEAL)
Attest:

EDWARD M. FLETCHER, JR.          ROBERT GOTTSCHALK
Attesting Officer                 Commissioner of Patents